United States Patent [19]

Jobling et al.

[11] 4,344,273

[45] Aug. 17, 1982

[54] LAWN SCARIFIER AND RAKE

[75] Inventors: Alan V. Jobling, Reading; David J. Crisp, London, both of England

[73] Assignee: Black & Decker Inc., Newark, Del.

[21] Appl. No.: 180,463

[22] Filed: Aug. 22, 1980

[51] Int. Cl.³ .......................................... A01D 35/12
[52] U.S. Cl. .................................... 56/16.7; 56/364; 56/372
[58] Field of Search ................. 56/364, 365, 367, 369, 56/370, 371, 372, 16.4, 16.7, 14.4, 130

[56] References Cited

U.S. PATENT DOCUMENTS

| | | | |
|---|---|---|---|
| 383,796 | 5/1888 | Burfeind | 56/130 |
| 2,548,329 | 4/1951 | Sickle | 56/364 |
| 2,595,177 | 4/1952 | Stevens | 56/364 |
| 3,125,844 | 3/1964 | Beyer | 56/372 |
| 3,308,612 | 3/1967 | Oblinger | 56/364 |
| 3,478,500 | 11/1969 | Rhoads | 56/372 |
| 4,134,249 | 1/1979 | Wuerker et al. | 56/295 |
| 4,255,923 | 3/1981 | Spaida et al. | 56/364 |

FOREIGN PATENT DOCUMENTS

| | | | |
|---|---|---|---|
| 1166543 | 3/1964 | Fed. Rep. of Germany | 56/364 |
| 2022985 | 12/1979 | United Kingdom | 56/364 |

*Primary Examiner*—Robert A. Hafer
*Attorney, Agent, or Firm*—Walter Ottesen; Harold Weinstein; Edward D. Murphy

[57] ABSTRACT

A turf scarifier and raker includes a housing with an elongated upright handle and having suitably positioned wheels designed to permit traversing movements over turf while the operator is in a standing position. The housing has an electric motor positioned in essentially the same plane as a tine assembly driven by the electric motor. The tine assembly has a plurality of tines which extend through an opening at the bottom of the housing. The tines result from a plurality of torsion coil springs having radially extending active ends that are serially threaded on rods arcuately and radially located about a central axle of the tine assembly. The active ends come into contact with the turf when the device is operated. At the same time, the other ends of the springs are inhibited from turning torque, preferably by lying in abutment against the central axle. The tines are arranged along helical paths about the central axel to contribute to a more constant torque resistance to the rotation of the tine assembly by causing the tines along each helical path to successively engage the lawn.

24 Claims, 11 Drawing Figures

LAWN SCARIFIER AND RAKE

BACKGROUND OF THE INVENTION

It has been determined that in order to produce and maintain a high grade lawn, it is necessary to provide the conditions which will encourage the growth of the finer turf grasses. Such conditions, however, at the same time should be hostile to the coarse and surface creeping grasses which are both unsightly. If not controlled such grasses will choke out the finer growth.

Past experience has demonstrated that two of the operations which are essential to achieving these conditions are periodically scarifying the turf in order to remove dead mat and moss. The second operation includes the regular raking of the surface of the lawn to lift up the stolons of creeping grasses and weeds so that these can be cut short by subsequent mowing or scything or provision may be made for uprooting the offensive grasses and weeds. It is also necessary from time to time to remove surface debris such as leaves, twigs and small stones.

It will be obvious that for the average amateur gardener the only means available for performing these tasks is laborious hand raking with a wire rake or similar tool, or brushing and removal of the debris by hand in order to produce a well manicured lawn. These operations are both very time consuming and extremely tiring so that relatively few gardeners are able or willing to perform them as often as is needed or desirable. Furthermore, it is generally recommended that moss should be chemically killed before removal to prevent the moss from spreading, requiring yet another operation.

Mechanical scarifying equipment is available for professional use on golf courses, sports grounds and the like, but such machines require a certain degree of skill to operate and in unskilled hands could cause excessive damage or be themselves seriously damaged by striking hard obstructions or surfaces. They are also generally too heavy and cumbersome for use in the confined areas of the average domestic garden and do require that the turf should be reasonably free from undulations. Finally, of course, as would be expected such equipment is very costly.

Although hand propelled rotary brushes and suction cleaners are available for clearing surface debris they have no other use and can only be justified if large areas of turf are involved.

SUMMARY OF THE INVENTION

The present invention pertains to a device which is a mechanical lawn scarifier and raker, particularly suitable to the needs of the home or amateur gardener. It enables all of the functions of scarifying, raking, brushing and collecting of debris to be performed more effectively, in a much shorter time and with very much less physical effort than by the use of conventional hand tools. The device is light in weight and easily manipulated making it suitable for use in confined spaces and small areas as well as on more extensive stretches of turf. Its operation requires no great skill, mechanical aptitude or physical strength and it cannot do excessive damage to the turf or be damaged by traversing hard surfaces such as brick or stone paths.

A mechanical lawn scarifier and rake in accordance with this invention comprises a cylindrical rake rotatably mounted in a frame or supported by wheels and by a roller, the latter adapted and constructed to control the height of a raking helix relative to the ground surface. The raking helix describes a cylindrical configuration consisting of two or more rows of radially disposed teeth or tines positioned symmetrically and helically about, and suitably attached to, a central horizontal shaft or spindle. When the cylinder is rotated the tines are forced through the surface of the turf to a depth which can be pre-set by a suitable means of adjustment according to requirements. The helix angle of the rows of tines is such that the first tine in any one row is in the same axial plane as the last tine of the preceding row, thus ensuring a substantially constant torque resistance to the rotation of the cylinder as the tines along each individual rod successively engages the lawn. In use, the tine carrying means is rotationally driven by an electric motor or other suitable power source at a speed sufficient to ensure that when the machine is propelled forward at a normal walking pace successive tines make contact with the turf in a substantially continuous line.

It will be appreciated that the power source may also be employed to propel the device in a forward direction by driving the wheels or rollers. The preferred embodiment contemplates that it should be hand propelled and therefore a suitable upright inclined handle is provided. Thereby the forward speed can be instantly adjusted according to conditions and at the same time the device can be given a reciprocating motion, that is, can be moved repeatedly forwards and backwards over stubborn areas of moss, dead mat and/or unwanted growth. In fact the direction of rotation of the helix is such that forward propulsion is somewhat assisted thereby reducing the effort required by the operator of the device.

If the teeth or tines were rigid elements and, further, rigidly attached to a central shaft there would undoubtedly be excessive or inadequate penetration into the turf through slight errors in setting the height or where undulations in the surface contours occur. Concomitantly, there would also be enhanced risk of permanent distortion or breakage of the tines if solid obstructions were encountered. It is therefore a salutary feature of the present invention that the tines, while being stiff enough to ensure adequate scarification, are nevertheless sufficiently flexible to withstand considerable deflection both forwards and backwards relative to the direction of rotation. This feature permits some latitude in setting the height without unduly affecting performance and avoids any risk of damage to the tines.

The device may be set whereby the helix supplies vigorous scarification to the surface and due to the flexibility of the tines will not actually result in digging up the soil. Alternatively, when it is only required to remove surface debris, the device may be set whereby the tines of the helix are clear of the ground so that no untoward damage to the grasses will occur.

A further advantage of employing flexible tines is that having been deflected backwards relative to the direction of rotation on entering the turf, the tines spring forward on leaving it with a much higher top velocity than that imparted by the rotation of the helix, thus projecting the debris upwards and into a supplied bin with greater force than would otherwise be achieved. This debris is then guided by a curved deflector plate into the bin suitably mounted on the forward portion of the device. The bin is designed for easy removal for disposal of the contents in much the same way as the grass catcher on a conventional lawn mower. As most of the debris is collected in the bin, it is not essential to exterminate the moss prior to its removal as its spread is defeated and prolonged and frequent use of the device will greatly discourage its re-establishment.

BRIEF DESCRIPTION OF THE DRAWINGS

The invention will now be described with reference to the drawings wherein.

DETAILED DESCRIPTION OF THE INVENTION INCLUDING VARIOUS EMBODIMENTS THEREOF

Figure 1:
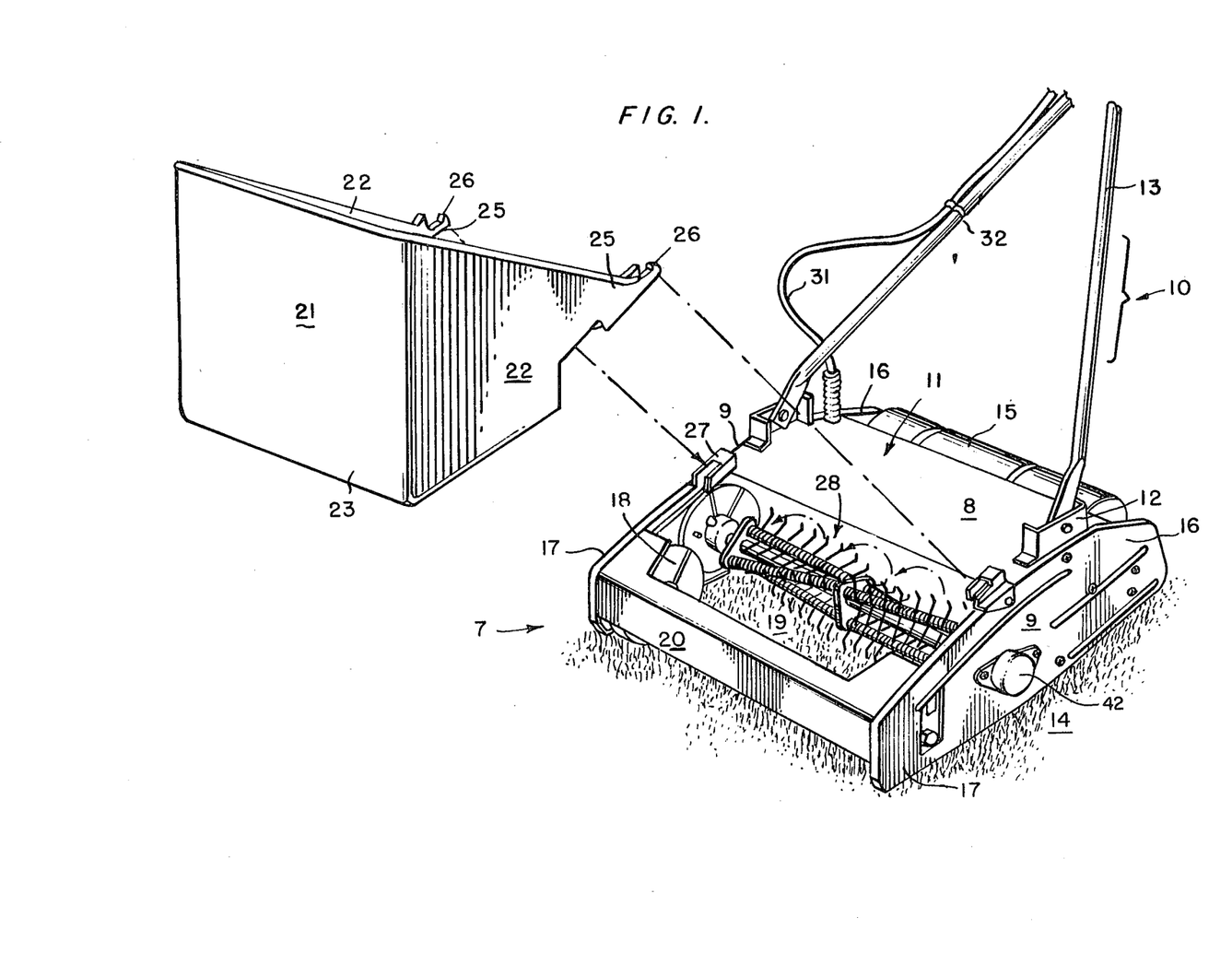
FIG. 1 is a perspective view of the lawn scarifier and raker.

Attention is directed to FIG. 1, at the first instance, for a consideration of the device shown, generally, by reference numeral 10 hereinafter to be discussed. The device includes a carriage 7 encompassing a carriage or housing 11 which may be constructed of metal or the like. It has side walls 9 and a top portion 8. The housing 11 has a handle mounting means 12 at each side of the upwardly facing portion of the housing to which the yoke portion upstanding of a bifurcated handle 13 is pivotally secured.

The device 10 is supported on turf 14 at the rear by means of a rearwardly positioned elongated roller 15 which has axle means having ends which fit into adjustable support means located inside rearwardly extending portions 16. At the forward portion 17 of the housing, the device is supplied with wheels 18 which in one embodiment are secured to stub axles horizontally secured internally of the forwardly extending portions 17 of the housing 11.

The housing 11 has a large substantially rectangularly shaped opening 19 in the top portion 8 at the forwardly extending portions 17 of the housing 11 through which debris and grass may be hurled when the device 10 is operated.

Figure 2:
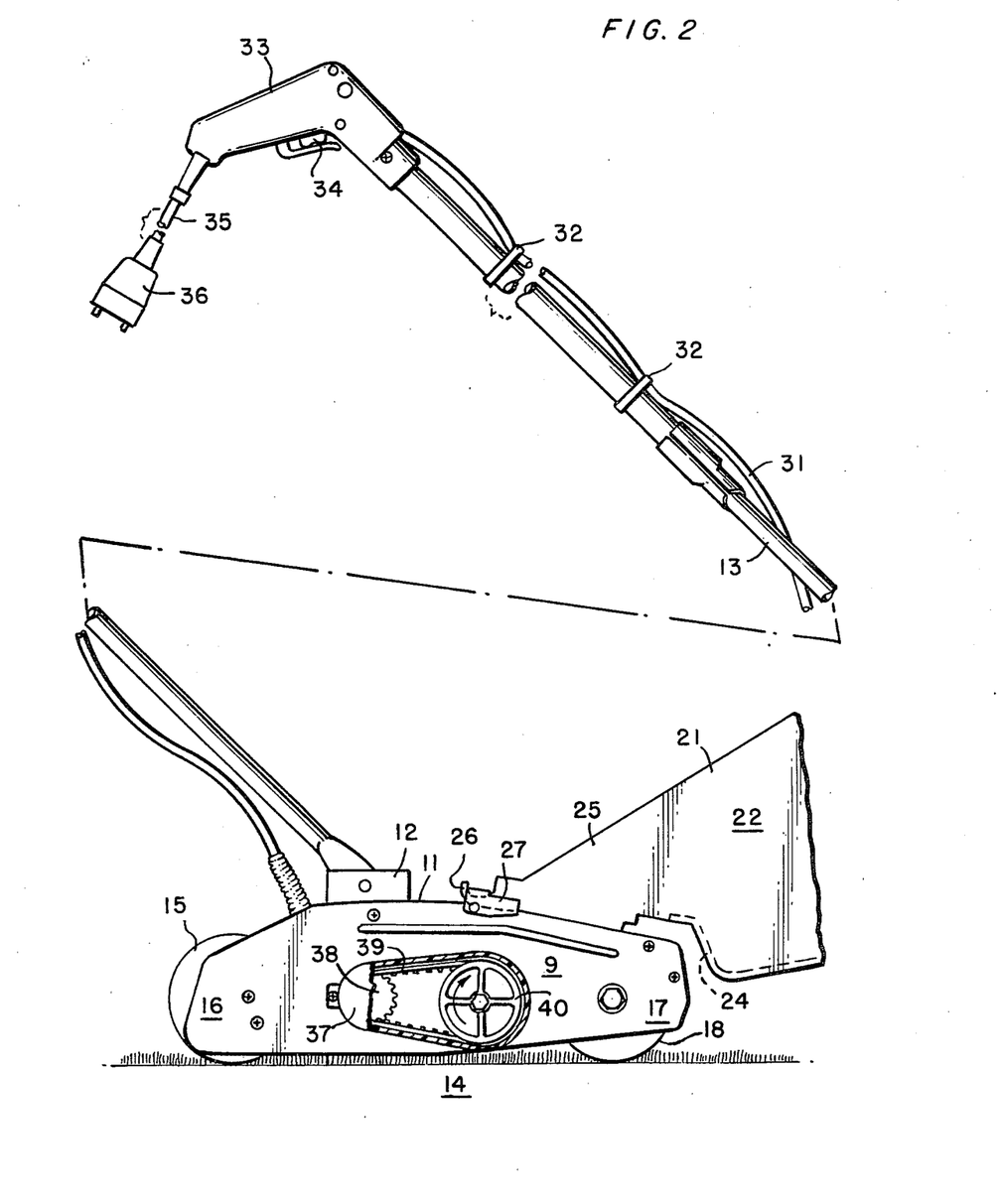
FIG. 2 is a side elevation view of the side having the transmission with the area of interest broken away.

The housing 11 has a bridging portion 20 between the aforementioned forwardly extending portions 17. FIG. 1 shows that the device 11 can be provided with an upwardly open facing catcher 21 which has relatively substantial side walls 22 and a frontwardly facing wall 23 and a relatively minor low wall 24 at the side facing the opening 19 of the housing (see more aptly in FIG. 2). The catcher or bin 21 possesses rearwardly extending arms 25 which are integral with the side walls 22 thereof. Each arm 25 terminates in a hook 26 adapted to hookingly engage a retaining member 27 mounted at the top and side portions of the housing.

A tine assembly 28 is seen through the aforementioned opening 19. The arrows shown on the drawing describe the rotation of the tine assembly 28 when the device is operated. It is this tine assembly 28 that is adapted and constructed to effectively hurl the debris and/or grass material through the opening as a result of its being rotatably driven by an electric motor 29 (see FIG. 5). The electric motor 29 is located in back of the tine assembly 28 and is suitably enclosed by the housing 11. The axis of the motor is substantially in the same horizontal plane as the rotational axis of the tine assembly 28. The transmission means 30 between the tine assembly 28 and the electric motor includes a belt 39 as will be discussed below.

The upper surface of the housing 11 has, seen from FIG. 1, an electric conduit 31 which is secured to the handle 13 by clips 32.

Having considered the overall configuration of the device as can be best discerned from FIG. 1, attention is now more particularly directed to the other figures for an even more detailed consideration. Note, for instance, from FIG. 2 that the handle 13 converges to a single hand grip 33 having along the bottom portion an electric finger operated switch 34. The end of the handle has projecting therefrom a relatively short electric cable 35 terminating in a male plug 36 which may be plugged into the female portion of an extension cord (not shown).

The transmission 30 will be seen to be covered with cap 37 removably secured to the side 9 of the housing 11 by conventional means. Therefore external to the housing 11 is the drive gear 38 operatively mounted to the drive shaft of the electric motor 31. A timing type belt 39 operates off this drive gear 38 and around the driven gear 40 which is operatively connected to the tine assembly 28. A number of other features can be seen from FIG. 2 that were mentioned above when discussing the positioning of the catcher 21 for instance, especially see the manner of hooking of the catcher 21.

Figure 3:
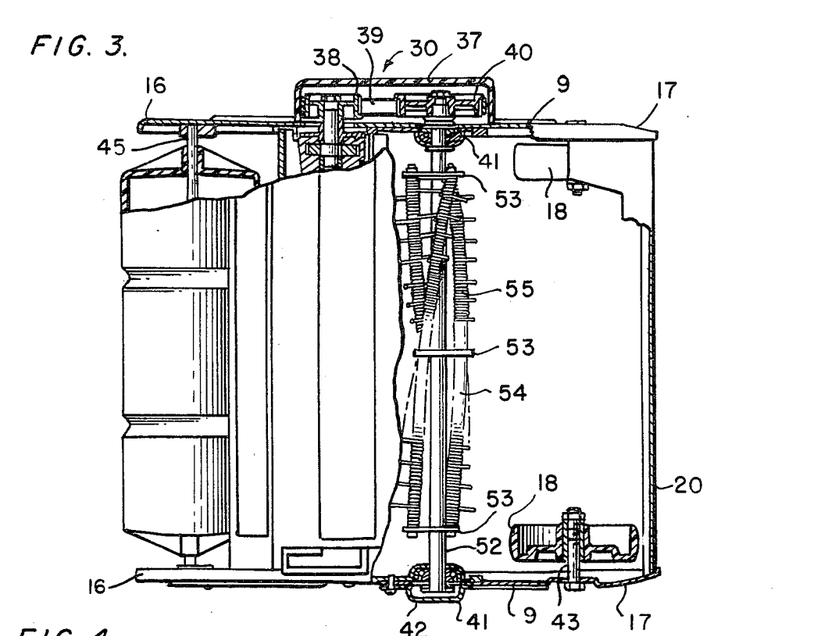
FIG. 3 is a top plan view with points of interest in fragmentary form.

From FIG. 3 it will be seen that the tine assembly 28 is suitably journaled in bearings 41 located at oppositely disposed points of the side walls 9. An externally located cap 42 is provided externally at the side wall opposite the transmission 30 to protect one of the bearings 41 but is accessible for lubrication.

Figure 4:
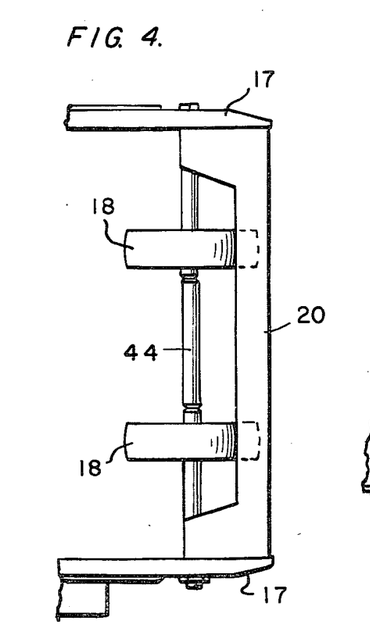
FIG. 4 is a top plan fragmentary view to show shift of front wheels.

Note the manner of mounting the stub axles 43 at opposing sides of the forwardly extending portion 17 of the housing 11 for the wheels 18. In another embodiment, as depicted by FIG. 4, the wheels 18 are mounted on an axle 44 that is conventionally mounted in place of the stub axles. By providing a single axle 44, the wheels 18 may be moved therealong somewhat as shown in FIG. 4. When a lawn is to be traversed that possesses a crown or ridges, more closely associated wheels will have more of a tendency to ride on such crown or ridges thereby obviating possible scalping effects that may otherwise occur. While the wheels may be located anywhere on the axle, notches are provided to accept spring loaded balls in the bore of the wheels so that the wheels may be positioned in association with such notches and will be retained thereby to prevent migration of the wheels along the axle.

Figure 5:
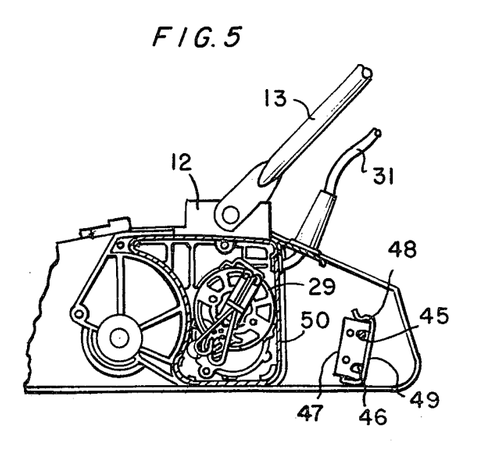
FIG. 5 is a fragmentary side elevation partially broken away to show area of interest.

As can be seen from FIG. 3, the rearwardly positioned roller 15 is essentially a hollow cylinder mounted on an axle 45 that is restrained into one of several notches 46 in a plastic block 47 secured opposingly and internally of the rearwardly extending portion 16, as can be seen from FIG. 5. As stated the axle 45 is restrained by a hinged clip 49 that is hinged at the bottom and clasps the block at a raised portion 48. By moving the axle 45 of the roller 15 to one of the two notches 46 depicted in the block as shown in FIG. 5 the roller 15 controls the height of the housing 11 above the grass and thereby the height of the presentation of the tine assembly 28.

FIG. 5 is also useful in depicting the fact that a secondary internal housing 50 is provided in which the electric motor 29 is secured in a manner to afford protection from the ambient. The forward portion 9 of the internal housing 50 has an arcuate forwardly facing wall 51 which follows the arc produced by the tine assembly 28 when it rotates and is slightly separated from the tine assembly 28. This arcuate wall 51 acts as a direction imparting chute for the debris and grass picked up by the tine assembly 28, more about which will be disclosed immediately in the following.

Figure 6:
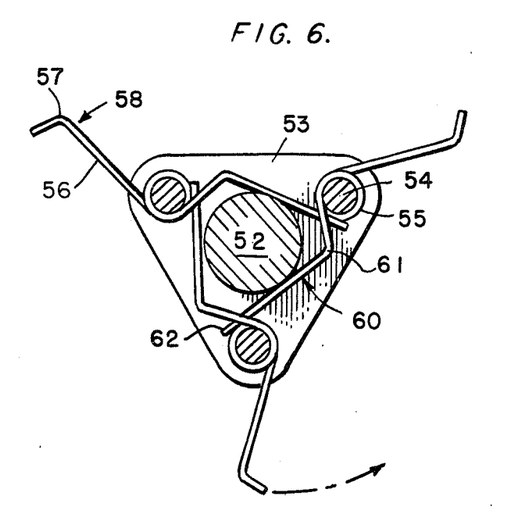
FIG. 6 is a cross-sectional view of the tine carrying helix arrangement.

Having been apprised of many of the features of the invention, attention is now additionally directed to the ingenious tine assembly 28 about which much has heretofore been alluded. From FIG. 3, it will be seen that the tine assembly includes central support means in the form of a central axle 52. The central axle 52 has rigidly fixed thereon in radial fashion three angularly spaced triangularly shaped plates 53, as can more readily be seen from FIGS. 6 and 7. One plate is located at the end portions of each of the ends of the central axle 52, and the third plate centrally therebetween. Each of the three plates have axial bores near their respective apex portions to accommodate helix means in the form of three rods 54. Each rod has an end suitably attached at a bore of one end plate, then each passes through a bore of the middle plate and each is then secured through a bore of the opposite end plate by a suitable means as by welding or upset metal deformation. The plates 53 by their positions produce a tripartite helix as can be seen from FIG. 3. From FIG. 3 it can be further discerned that each of the rods 54 has serially threaded thereon a plurality of tightly wound torsion coil springs 55, each has an active end 56 that terminates in a hook 57 defining a tine 58 and an essentially passive end 60 that has a sharply bent portion 61 and an elongated straight portion 62. The active end 56 extends substantially radially outwardly while the passive end 60 has a portion of its straight portion 62 in tangential abutment against the central axle 52 as can be seen from FIG. 6 when stress is applied against the tines 58.

Figure 7:
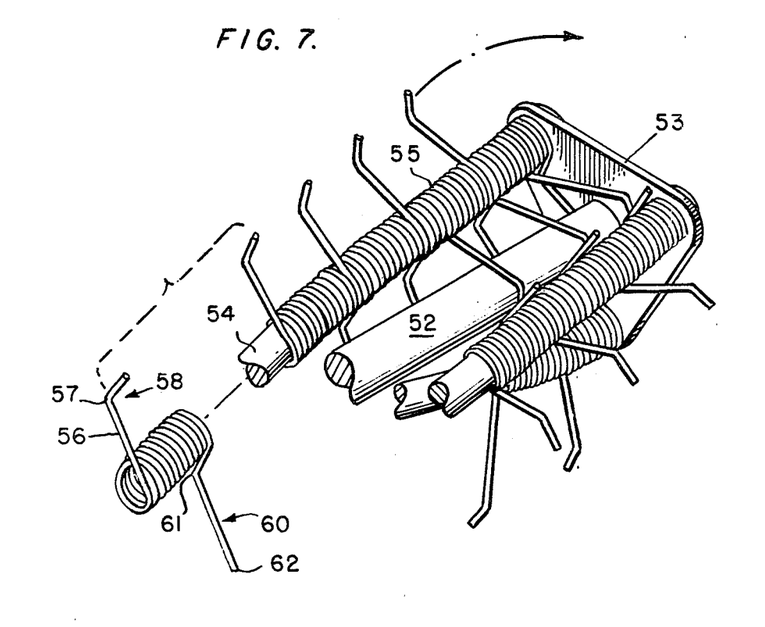
FIG. 7 is a perspective of the tine carrying helix arrangement in fragmentary form.

The fragmentary portion of the tine assembly 28 shown in FIG. 7 demonstrates succinctly that the said torsion coil springs 55 are threaded on the rods 54 in a manner so that each is disposed in the same direction as regards the respective active and passive ends. Each rod 54 passes helically through an angle of 120° in the length of the tine assembly 28 so that that first tine 58 in any one row is in the same axial plane as the last tine 58 in the preceding row.

In operation, the passive end 60 of each tine is restrained by being located between the central axle 52 and an adjacent row of tines. The active end 56 by having a slight hook 57 affords a more effective removal of material from the turf. The design of the torsion coil springs 55 is such that its active end 56 will withstand considerable torsional deflection in either direction with low relative risk of permanent distortion or breakage or of stressing the metal of the springs beyond the fatigue limit. The clearance between the coils and the rods 54 is just sufficient to prevent the springs 55 from locking at full deflection but small enough to give adequate lateral support to the active ends 56. Of course the coil springs absorb the turning moment imparted to the active ends 56 thereby inhibiting deflection.

Attention is now directed to FIGS. 8 to 11, for a detailed consideration of an ingenious embodiment incorporating new and additional principles. In this embodiment the tine assembly 28A includes only a single central axle 70 mounted by its respective end portions 71 thereof in journaling fashion as with the aforementioned tine assembly.

Figure 8:
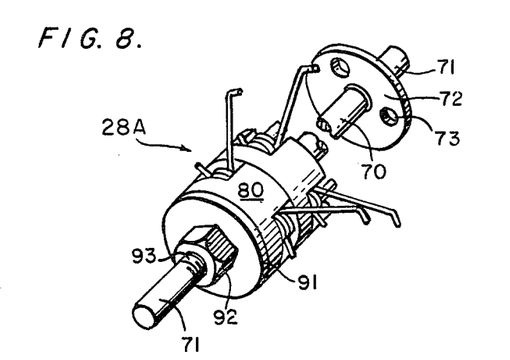
FIG. 8 is a perspective view in fragmentary form of another embodiment of the helix arrangement.

An end radial driving plate 72 is suitably affixed to one end portion of the axle 70 as by welding or the like. The plate 72 has three equally spaced apertures 73, the use of which will be discussed hereinafter. In this embodiment the coil springs 74 of a slightly different configuration, are carried by a carrier 75, which may be fabricated of metal or a polymer such as nylon. The carrier has the general shape of a disk having a front 76 and back 77, an axial bore 78 therethrough and a substantial outer circumference 80. The bore is of a diameter whereby it fits smoothly onto central axle 70.

Figure 11:
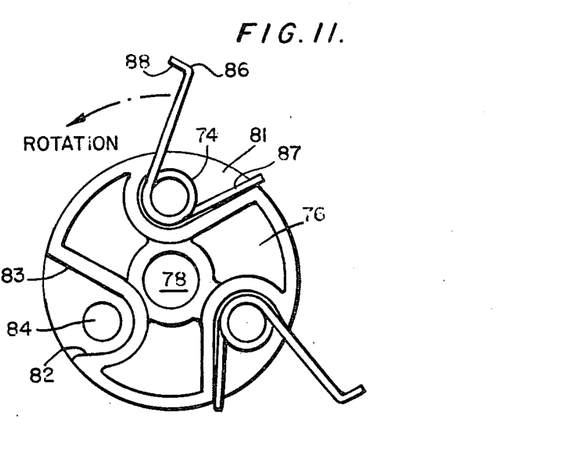
FIG. 11 is a view of the other end of the tine carrier of the said other embodiment.

From FIG. 11, particularly, it can be seen that each of the carriers 75 has three outwardly and front facing recesses 81, of a generally U-shaped configuration with one wall 82 comprising one leg shorter than the other wall 83 comprising the other leg. Each of the recesses possesses a post 84 extending axially with regard to the carrier 75 and has a portion 85 extending beyond the front face 76 as can be seen from FIG. 11.

A coil spring 74 is axially positioned onto each of said posts 84. The coil springs 74 has an active end 86 as heretofore extending out of the recess 81 along the shorter wall 82 of the recess. The reactive end 87 of the coil spring extends along the other longer wall 83 of the recess. The active end 86 terminates in a hook 88. The hook 88 operates in the same manner as heretofore and is inhibited from undue deflection by the reactive end 87 in abutment against the longer wall 83 of the recess when the rotation imparted to the carrier 75 as seen in FIG. 11 is counterclockwise.

Figure 9:
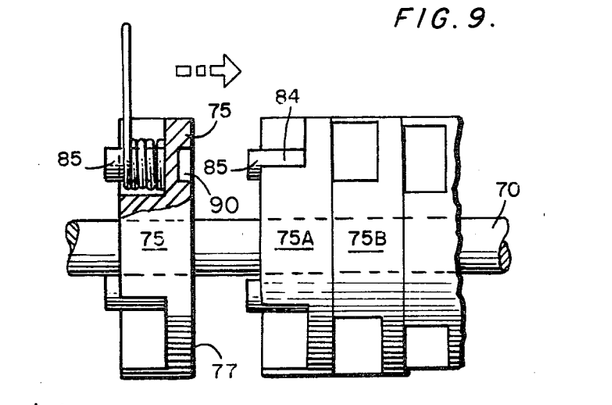
FIG. 9 is a side elevation of the other embodiment of the helix arrangement with an area of interest in cross-section.
Figure 10:
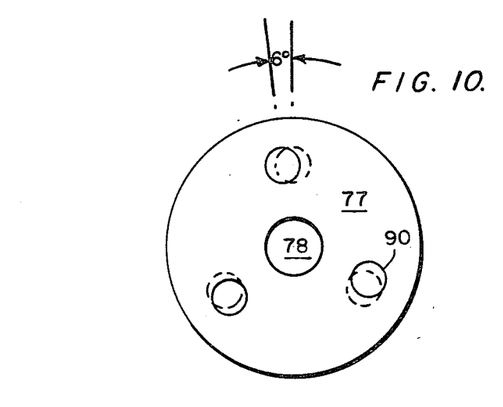
FIG. 10 is an end view of one of the tine carriers of the said other embodiment.

Now, viewing FIG. 9 and 10 together, it can be seen that the back of carrier 75 has three equidistant blind bores 90 which are dimensioned and positioned to receive and retain that portion 85 of the post 84 extending beyond the front 76 of the carrier to thereby provide a wall to the recesses 81 and to thereby retain the coil spring on the post 84. The recesses 81 have the appearance of pockets.

Turning to the perspective of FIG. 8, the first disk carrier 75 threaded onto the axle 70 is positioned whereby the portions 85 of the post extending beyond the front of the disk carrier is permitted to extend into and through the apertures 73 of the end plate 72. The second or next disc carrier 75A is then threaded onto the axle 70. However, as the blind bores 90 are offset by about 6° from the aperture 73 of the plate 72, the second disc carrier 75A is angularly offset from the first disc carrier that has been threaded on the axle 70 thereby the radially outwardly facing recesses 81 of the second disc carrier 75A are in a different angular position from the recesses 81 of the first disc carrier. Likewise the third disc carrier 75 B (See FIG. 9) mounted on the axle 70 again has its three blind bores 90 further offset by 6° so that there is a progressive 6° incremental change in the positioning of the radially outwardly facing recesses 81 as can be seen from FIG. 9, for instance. In other words the blind bores of the disc carriers when assembled are not in linear axial alignment parallel with the axle.

When all of the disc carriers 75 have been threaded in the progressive manner hereinabove mentioned, an end disc locking plate 91 is secured against the stack of disc carriers and a nut 92 is threaded onto suitable threads 93 of the end portion 71 of the axle whereby the disc carriers are clamped between the end driving plate 72 and the end locking plate 91. The resultant is a unitary device having outwardly radiating tines produced by the active ends 86 of the coil springs. The gradual 6° incremental arcuate progression of the recesses 75 and the concomitant active ends of the coil springs 74 describes a helix of tines.

As the carriers themselves are not keyed directly to the axle, it will be seen that the carriers are rotatably driven when the axle is rotated by virtue of the driving plate 72 which carriers the extending portions 85 of the posts of the first carrier. Likewise, then all the other carriers are locked together in the manner as heretofore stated culminated with the end locking plate 91 to provide a unitary stack rotatable in unison with the axle when it is driven.

We claim:

1. A lawn device, comprising:
a carriage supported for movement over a lawn;
a handle connected to the carriage and by which the device is manipulated over the lawn by an operator;
a motor supported by the carriage;
a tine assembly mounted in said carriage for rotation therein by said motor about an axis transverse to the direction of travel of the device over the lawn;
said tine assembly comprising a central axle, a plurality of rods supported by and radially spaced from said axle, and a plurality of tine members carried by each rod and defining a cylindrical configuration in use;
said tine members each comprising a portion encircling its respective rod and a tine extending outwardly from said portion, whereby each said tine is deflectable relative to its respective rod; and
said rods being symmetrically and helically positioned about said axle, whereby in use the helix arrangement contributes to a more constant torque resistance to the rotation of said tine assembly by causing the tines along each individual rod to successively engage the lawn.

2. A lawn scarifier and raker device, comprising:
a carriage supported for movement over a lawn;
a motor supported by the carriage;
a tine assembly mounted in the carriage for rotation by said motor, and comprising a central shaft, a frame and a plurality of tine members;
said shaft being rotatably supported by the carriage for rotation about an axis transverse to the direction of travel of the device over the lawn;
said frame comprising a plurality of rods supported by and radially spaced from said shaft, each rod defining a helical path about said shaft and having a plurality of said tine members mounted thereon;
each tine member comprising a coil spring threaded on a respective one of said rods, each coil spring terminating in two ends, one of said ends defining a tine extending outwardly from its respective rod and adapted to operate upon the lawn when the device is in use, and the other of said ends defining an arm extending inwardly between said shaft and another of said rods whereby said other end is restrained therebetween and abuts against said shaft when stress is applied against the tine during operation of the device; and
whereby the helical arrangement of each rod contributes to a more constant torque resistance to the rotation of said tine assembly by causing the tines along each individual rod to successively contact the lawn.

3. The device of claim 2, wherein said carriage has an opening through the top and bottom thereof and in which said tine assembly rotates, and further comprising a curved forwardly facing deflector plate supported by said carriage and defining the rear of said opening, whereby in operation debris and/or grass removed from the lawn by said tines is hurled upwardly from said opening and forwardly of the device.

4. The device of claim 3, further comprising a bin catcher releasably attached to said carriage and projecting forwardly thereof to collect the upwardly and forwardly hurled debris and/or grass.

5. The device of claim 2, wherein the carriage has a front and is traversingly supported by wheels on an axle proximate said front, said wheels being shiftable laterally inwardly along said axle whereby the distance between the wheels may be reduced to enable crowns and ridges in the lawn to be ridden and obviate scalping such.

6. The device of claim 2, wherein said motor is an electric motor having its axis substantially in the same horizontal plane as the axis of said tine assembly.

7. The device of claim 2, wherein said tine assembly comprises three helical rods positioned equidistant about the central shaft, upon each of which rods said coil springs are threaded.

8. The device of claim 2, wherein the arm of said other end each coil spring has a bend proximate the coil.

9. A turf scarifier and raker device, comprising:
a carriage;
a tine assembly rotatably mounted in the carriage; and
a prime mover operatively connected to the tine assembly for rotating the latter;
said tine assembly comprising:
a plurality of stacked axially aligned carrier means;
means for securing said stack whereby the stack may be rotated in unison when said device is operated;
each of said carrier means having at least one outwardly facing open pocket;
a plurality of coil springs having an elongated active end and a reactive end; and
means in said pocket for retaining said coil spring whereby the said elongated active end extends radially beyond said open pocket whereby said active ends engage the turf when said device is operated.

10. The device of claim 9, wherein the carrier means has three outwardly facing open pockets.

11. The device of claim 10, wherein each of said carrier means is positioned so as to cause the pockets of one carrier means to be offset by a minor angle from the pockets of the next adjacent carrier means, said offset being incremental and progressive to subtend on the part of the plurality of carrier means a relatively uniform continuing angle whereby the pockets and the elongated active ends of the coil springs define a helix arrangement.

12. The device of claim 11, wherein the means in said pocket for retaining a coil spring of one carrier means is adapted to be in operative cooperation with an adjacent carrier means to retain its relative position in said stack.

13. The device of claim 12, wherein each of the carrier means has a central bore and each is mounted on an axle.

14. In a lawn scarifier and rake, the combination of a carriage and means for longitudinally moving the carriage across the lawn, a shaft rotatably journaled in the carriage along an axis transverse to the longitudinal movement of the carriage, a plurality of respective rods spaced radially from the shaft, means for rotating the rods in unison with the shaft and about the axis of the shaft as an integral assembly, each of the rods being disposed along a helical angle with respect to the shaft, and a plurality of coil springs serially threaded axially on each rod and carried thereby, each of the springs having a pair of ends including an active end and a passive end respectively projecting radially of the rod, the active end being formed as a tine for engaging the lawn during operation, and the passive end being reactively deflected against the shaft substantially in tangential abutment thereto when stress is applied to the tine during operation, whereby the helical angle of the rods contributes to a more constant torque resistance to the rotation of said assembly by causing the tines along each rod to successively engage the lawn.

15. The combination of claim 14, wherein three rods are disposed around the shaft, each rod passing helically through an angle of substantially 120 degrees over its length, and wherein the first tine in any one row is in substantially the same axial plane as the last tine in the preceding row.

16. In a lawn scarifier and rake, the combination of a carriage and means for longitudinally moving the carriage across the lawn, a shaft rotatably journaled in the carriage along an axis transverse to the longitudinal movement of the carriage, a motor on the carriage for driving the shaft, three rods each spaced radially of the shaft and substantially equidistant to each other, means for rotating the rods in unison with the shaft and about the axis of the shaft as an integral assembly, each of the rods passing helically through an angle of substantially 120 degrees over its length, and a plurality of coil springs mounted on each rod in substantial axial abutting relationship to each other, and each of the springs having a radially-projecting end portion formed as a tine for engaging the lawn during operation, the first tine in any one row being in substantially the same axial plane as the last tine in the preceding row, thus ensuring a substantially constant torque resistance to the rotation of said assembly by causing the tines along each individual rod to make contact with the lawn in succession.

17. A lawn device, comprising:
a carriage supported for movement over a lawn and having an opening in the top thereof;
a handle connected to the carriage and by which the device is manipulated over the lawn by an operator;
a motor supported by the carriage;
a tine assembly mounted in said carriage in communication with said opening for rotation by said motor about an axis transverse to the direction of travel of the device over the lawn, the direction of rotation of said tine assembly assisting forward propulsion of said device;
said tine assembly comprising at least one rod spaced radially from and defining a helical path about said axis, and a plurality of tine members carried by said rod, each tine member having a portion encircling said rod with a tine extending outwardly from said portion and adapted to operate upon the lawn when the device is in use, whereby said helical path contributes to a more constant torque resistance by allowing the tines on said rod to successively operate upon the lawn; and
a forwardly facing deflector plate supported by said carriage at the rear of said opening, whereby in operation debris and/or grass removed from the lawn by said tines is hurled upwardly through said opening and forwardly of said carriage.

18. The lawn device of claim 17, wherein said tine assembly includes a central shaft mounted in said carriage for rotation about said axis, and support members attached to said shaft and supporting said rod in spaced relation thereto.

19. The lawn device of claim 18, wherein said portion of the tine members has an arm extending inwardly of the tine assembly and abutting against said shaft when stress is applied against the tine during operation of the device.

20. The lawn device of claim 17, wherein said deflector plate is arcuate and in close relationship to said tine assembly, and further comprising a bin catcher releasably attached to said carriage and projecting forwardly thereof for collecting the forwardly directed debris and/or grass.

21. The lawn device of claim 17, wherein said tine assembly has at least two of said helical rods carrying tine members, and said rods are supported on said shaft by at least three said support members, one at each end of the tine assembly and one intermediate the length thereof.

22. The lawn device of claim 17, wherein the motor is electrically powered and is mounted in a closed housing in said carriage rearwardly of said forwardly facing deflector plate.

23. The lawn device of claim 17, wherein rotatable members are rotatably mounted at the front of said carriage, and a roller is rotatably mounted at the rear of said carriage, whereby said carriage is supported for movement over the lawn.

24. The lawn device of claim 23, wherein said roller is adjustably mounted to control the height of said carriage above the grass of the lawn between two positions, one in which said tines scarify the surface and another in which said tines are clear of the ground.

* * * * *